United States Patent Office 3,711,435
Patented Jan. 16, 1973

3,711,435
STABLE AQUEOUS DISPERSIONS OF ETHYLENE AMINOALKYL ACRYLATE COPOLYMERS
Clarence Frederick Hammer, Wilmington, and Philip Joseph Keller, Claymont, Del., assignors to E. I. du Pont de Nemours and Company, Wilmington, Del.
No Drawing. Filed Jan. 29, 1971, Ser. No. 111,108
Int. Cl. C08f 37/00
U.S. Cl. 260—29.6 HN                   14 Claims

ABSTRACT OF THE DISCLOSURE

Stable, aqueous, cationic polyelectrolyte dispersions are provided in which copolymers of ethylene and selected aminoalkyl acrylates and methacrylates are self-dispersed in water with acids having a dissociation constant greater than $10^{-5}$. Such dispersions are prepared by stirring water, a copolymer and an acid in a vessel, preferably at a temperature above the melting point of the copolymer when the copolymer is of high molecular weight and ethylene content. While there are a number of uses for such dispersions, particularly preferred uses are: (1) cured, ultra-thin coatings on metallic substrates, particularly aluminum, (2) as acid dyeable coatings on cellulosic substrates such as paper, and (3) as flocculating agents for removing suspended matter from water.

BACKGROUND OF THE INVENTION

Field of the invention

This invention relates to stable, aqueous dispersions of ethylene copolymers, processes for their preparation and uses thereof. More particularly, this invention relates to stable, aqueous cationic polyelectrolyte dispersions of selected ethylene copolymers, processes for their preparation and uses thereof.

Prior art

Copolymers of ethylene and aminoalkyl acrylates and methacrylates are well known and have been used for a variety of purposes. In U.S. Patent 2,625,529 issued to Roff M. Hedrick and David T. Mowry on Jan. 13, 1953, water-soluble copolymers of about 0 to 15 weight percent ethylene and about 85 to 100 percent of an aminoalkyl acrylate or methacrylate are disclosed as soil conditioning agents. Due to the solubility of these copolymers their use has been limited. U.S. Patent 3,395,198 issued to Isoji Taniguchi et al. on July 30, 1968, and U.S. Patent 3,243,418 issued to Robert P. Shouse, Clarence J. Vetter and William E. Daniel on March 29, 1966 disclose higher molecular weight copolymers used as dye-sites when blended with polyolefins and as coatings for porous substrates. In U.S. Patent 3,480,463 issued to David Rankin on Nov. 25, 1969, oxygen cross-linking of the copolymer coatings is disclosed as well as preparation of the copolymers by emulsion copolymerization.

SUMMARY OF THE INVENTION

According to the present invention there is provided a stable, aqueous, cationic polyelectrolyte dispersion comprising: a copolymer of about 20 to 80 percent by weight ethylene and about 80 to 20 percent by weight of an aminoalkyl acrylate of the formula:

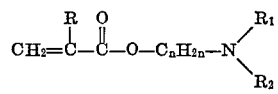

wherein
R is hydrogen or methyl,
$R_1$ and $R_2$ are each a member selected from the group consisting of hydrogen and alkyl of 1 to 4 carbon atoms, and
n is a positive integer of 1 to 4 inclusive, self-dispersed in water with an acid having a dissociation constant greater than $10^{-5}$, said copolymer having a degree of neutralization of the amine groups of at least 40 percent and a particle size less than 0.1 micron and said dispersion having a solids content within the range of about 5 to 30 percent by weight.

There is also provided a process for preparing such a dispersion comprising: mixing (1) a copolymer of about 20 to 80 percent by weight ethylene and about 80 to 20 percent by weight of an aminoalkyl acrylate of the formula:

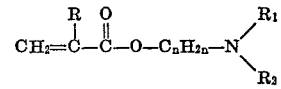

wherein
R is hydrogen or methyl,
$R_1$ and $R_2$ are each a member selected from the group consisting of hydrogen and alkyl of 1 to 4 carbon atoms, and
n is a positive integer of 1 to 4 inclusive, (2) an acid having a dissociation constant greater than $10^{-5}$, and (3) water in ratios sufficient to provide a solids content within the range of about 5 to 30 percent by weight and a degree of neutralization of the amine groups of the polymer of at least about 40 to 95 percent, at a temperature such that the copolymer will be dispersed into a particle size less than 0.1 micron.

Further provided is an article comprising a substrate and a coating on at least portions of at least one surface thereof of the dispersed phase of the above-mentioned dispersion.

There is further provided a process for treating water containing suspended matter comprising adding to the water the above-mentioned dispersion in which the cationic polyelectrolyte functions as a flocculating agent; permitting a floc of a portion of the suspended matter and the polyelectrolyte to settle and separating the floc from the treated water.

DETAILED DESCRIPTION OF THE INVENTION

The usefulness of water-insoluble copolymers of ethylene and aminoalkyl acrylates or methacrylates has been extended by the present invention by dispersing them in water with acids having a dissociation constant greater than $10^{-5}$. Properties of the dispersions are unique because the copolymer is dispersed as very small (less than 0.1 micron in diameter), positively charged particles which function as a surfactant for the dispersions and which also allow the dispersions to coalesce into very thin (less than 0.1 mil) pinhole-free coatings on aluminum.

The copolymer which forms the solid phase in the dispersions is a copolymer of ethylene and an aminoalkyl acrylate compound. Such copolymers are described in U.S. Pat. 3,395,198 from column 2, line 42 to column 3, line 63, and such disclosure is hereby incorporated by reference. Particularly preferred copolymers and their preparation are described in copending application Ser. No. 834,196, filed June 2, 1969, in the name of C. F.

Hammer and assigned to the assignee of the present application, the disclosure of which is hereby incorporated by reference.

Generally, as described in the above-identified patent and patent application, the copolymers, as they apply to the present invention, contain about 20 to 80 percent by weight ethylene (preferably about 50 to 80 percent by weight) and about 80 to 20 percent by weight of an aminoalkyl acrylate (preferably about 50 to 20 percent by weight) having the formula:

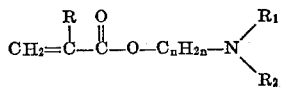

wherein

R is hydrogen or methyl, $R_1$ and $R_2$ are each a member selected from the group consisting of hydrogen, and alkyl of 1 to 4 carbon atoms, and $n$ is a positive integer of 1 to 4 inclusive.

Melt indices of the copolymers will range from about 0.1 to 5000, preferably 1 to 500. Preferred aminoalkyl acrylate compounds are N,N-dimethylaminoethyl acrylate and methacrylate, aminoethyl acrylate and methacrylate, N-methylaminoethyl acrylate and methacrylate, N-t-butylaminoethyl acrylate and methacrylate, and N,N-dimethylaminopropyl acrylate and methacrylate. An especially preferred monomer is N,N-dimethylaminoethyl methacrylate.

Copolymers prepared as described in the above-identified patent application will have a melting point defined by the equation:

$$Tm - 125°\ C. = \alpha\ (\text{wt. percent aminoalkyl acrylate})$$

wherein $\alpha$ is within the range of 1.1 to 1.9 and a thermal stability such that when the temperature is raised at 10° C./min. under flowing nitrogen, less than 0.75 percent of the copolymer weight has been lost at 300° C.

The acid used to disperse the copolymer and give it the properties of a cationic polyelectrolyte can be any inorganic or organic acid having a dissociation constant greater than $10^{-5}$. Such acids are preferably the mineral acids, i.e., sulfuric acid, hydrochloric acid, nitric acid, perchloric acid, hydrofluoric acid, hydrobromic acid, hydroiodic acid, and phosphoric acid. However, water-soluble organic acids can be used such as acetic acid and its halogenated derivative, oxalic acid, formic acid and citric acid. While dispersions can be formed with any of these acids, more acid is needed to form the dispersion when the acid used has a lower dissociation constant.

The dispersion is formed by mixing the copolymer, water and the acid in ratios sufficient to provide a solids content within the range of about 5 to 30 percent by weight (preferably 10 to 20 percent by weight) and a degree of neutralization of the polymer amine groups within the range of about 40 to 95 percent, preferably about 60 to 70 percent, at a temperature such that the copolymer will be dispersed into a particle size less than 0.1 micron. Generally, the temperature employed will increase with increasing ethylene content. When the ethylene content is approximately 50 percent by weight and above, the mixture is heated above the melting point of the copolymer. The solids level will vary with the type of acid used and the degree of neutralization. While dispersion pH is inherent in that the copolymer is self-dispersed with the acid, the pH of the dispersion as prepared will be between pH 3 and 6. After preparation the pH of the dispersion can be adjusted especially downward to pH 1 without adversely affecting the dispersion. A preparation pH under 3 results in gelation of the dispersion whereas a preparation pH over 6 results in only a partial dispersion. Vigorous stirring of the mixture is not needed; however, it does decrease the time needed to form the dispersion.

The copolymer particles in the dispersion are cationically charged and the particle size is less than 0.1 micron and is thought to go as low as 0.001 micron. Particle size depends on the acid and copolymer used. Generally, the particle sizes will be within the range of 0.01 to 0.05 micron.

The degree of neutralization of the copolymer amine groups by strong acids is at least 40 percent, but generally wil lbe within the range of about 40 to 95 percent, preferably 60 to 70 percent. If the degree of neutralization is lower than about 40 percent, the particle size of the copolymer tends to become too large.

For weak acids ($Ka < 10^{-2}$) the degree of neutralization will also be 40 to 95 percent. However, it must be calculated from the theory of weak acids and weak bases rather than stoichiometry.

Other materials such as pigments, dyes, plasticizers, slip or anti-blocking agents, and fillers can be added to the dispersions of the present invention as modifiers. Properties of the dispersions can also be modified by blending the dispersions with other polymeric latices which are non-ionic or cationic in character. For example, adhesion of resulting coatings to substrates can be modified by blending the dispersions of the invention with polymeric latices known in the art to be good adhesives such as a polyvinyl acetate emulsion, and a vinyl acetate/ethylene copolymer emulsion. The composition of the blended materials will depend upon which property is to predominate.

While the dispersions have many uses, e.g., as components of textile finishing baths, as hair setting resins, as curing agents for water-soluble epoxies, as sizes for glass fibers, as coatings on various types of substrates including detergent-resistant floor finishes and as adhesion promoters for latexes, the dispersions are especially useful as flocculants for treating water containing suspended matter, for forming thin pinhole-free coatings on metallic substrates such as aluminum, and as means to fix acid dyes to cellulosics such as paper.

For use as a flocculant, the dispersions can be used with various processes of sewage or industrial waste water treatment in which a digestion, filtration or settling step, or combination thereof, is used. In carrying out the water treatment process, the dispersion, in which the copolymer acts as a cationic polyelectrolyte, is added to the water containing suspended matter, including anionically stabilized dispersions, preferably with agitation whereby a distribution of the dispersed polyelectrolyte flocculating agent throughout the suspension is accomplished quickly. Agitation should not be so turbulent as to degrade flocs building up immediately after dispersion addition. The dispersion-treated suspension is then permitted to settle so that the flocs formed by the suspended matter and the polyelectrolyte are concentrated in a substratum which can be separated from the water by any separation technique such as filtration, decantation, sedimentation or centrifugation.

The dispersion is normally added to the suspension to be treated as a dilute dispersion; thus, it must be stable to dilution to 0.025 percent by weight solids or less. Since the dispersions do not contain added surfactants which will leave the copolymer-water interface and go into the water and thus de-stabilize the dispersions, the dispersions can be diluted to a solids content as low as desired. Generally, however, the dispersions are diluted to 0.1 to 1.0 percent solids for use as a flocculant.

The concentration of dispersion used to treat suspended matter in water will depend upon the particular dispersion used, the particular aqueous suspension to be treated and the treatment time. Generally, while the preferred concentration for economic reasons will be within the range of 0.1 to 10 parts of dispersion per million parts (p.p.m.) of aqueous suspension to be treated, it is to be appreciated that up to 100 p.p.m. of dispersion can be used with some aqueous suspensions to be treated.

Also, if the aqueous suspension to be treated contains exceptionally high concentrations of suspended matter, a greater concentration of dispersion (up to 1000 p.p.m.) can be used.

Since the copolymer particle size in the dispersions is very small, very thin (less than 0.1 mil.) coatings formed from the dispersions have been pinhole-free. These coatings can then be thermally cross-linked by heating at 150° C. and above to make them insoluble in boiling perchloroethylene. When the coatings are on metallic substrates such as aluminum and are based on the preferred copolymers, they can be heated at 240° C. for less than 3 minutes so that they will pass the acid copper sulfate test for pinholes. Generally, the preferred coatings can be cured by heating at a temperature of 200 to 280° C. for less than 3 minutes. It has been found that coatings on aluminum formed from the small particle size dispersions can be as thin as 0.01 to 0.05 mil in thickness and still be pinhole-free.

When the dispersions are used to coat cellulosic substrates such as paper, the cellulosic can be dyed with acid dyes either in patterns or over the entire surface. The dye can be applied in patterns after the paper has been coated, or the coating itself can be patterned on the paper. Also, colored paper can be prepared at the wet end of the paper machine instead of the dry end. This is accomplished by adding the polymer dispersion to the pulp, agitating the system and then adding an aqueous solution of a sulfonic acid dye. The dye and the polymer are exhaustively adsorbed onto the paper surface. When the pulp is laid on the web, colored paper is formed and a clear colorless aqueous filtrate is obtained.

The invention can be further understood by referring to the following examples in which parts and percentages are by weight unless otherwise indicated.

EXAMPLE 1

The following was added to a 500 ml. resin kettle: 50 gms. of beads of a copolymer of 70% ethylene and 30% dimethyl-aminoethyl methacrylate having a melt index of 300, 71.6 mls. of 1 normal HCl, and 126.4 mls. of water. The mixture was then heated to reflux with vigorous stirring, held at reflux for 30 minutes and then discharged and filtered through cheesecloth. The dispersion had a pH of 4.2 and a solids content of 20%. The copolymer had 75% of the amine groups neutralized and a particle size of 0.01 to 0.03$\mu$.

EXAMPLE 2

The following was charged into a stirred 1-liter autoclave: 100 gms. of beads of a copolymer of 80% ethylene and 20% dimethylaminoethyl methacrylate having a melt index of 123, 71.6 mls. of 1 normal HCl, and 328.4 mls. of water. The mixture was heated to 125° C. with vigorous stirring, held at 125° C. for 1 hr. and then discharged. A grayish-white dispersion was obtained. The dispersion had a pH of 4.1 and a solids content of 20%. The copolymer had 56.2% of the amine groups neutralized and had a particle size of less than 0.05$\mu$.

EXAMPLE 3

The following was charged into a 500 ml. resin kettle: 50 gms. of the copolymer of Example 1, 65 mls. of 1 normal nitric acid, and 135 mls. of water. The mixture was heated to boiling with rapid stirring and held until dispersed. A dispersion was obtained which set into a soft gel upon cooling. However, when this material was diluted to 10% solids, a very fluid dispersion was obtained having a pH of 4.7. The copolymer was 68% neutralized and had a particle size of less than 0.05$\mu$.

EXAMPLE 4

The following was charged into a 500 ml. resin kettle: 50 gms. of beads of a copolymer of 65% ethylene and 35% dimethylaminopropyl methacrylate having a melt index of 145, 65 mls. of 1 normal hydrochloric acid, and 135 mls. of water. The mixture was heated to 100° C. with rapid stirring and held at 100° C. for 1 hr. A fluid dispersion was obtained with a pH of 5.1 and a solids content of 20%. The copolymer particle size was less than 0.05$\mu$ and had a degree of neutralization of 63.5%.

EXAMPLE 5

The following was charged into a 500 ml. resin kettle: 50 gms. of beads of a copolymer of 70% ethylene and 30% dimethylaminopropyl methacrylate having a melt index of 66.6, 65 mls. of 1 normal hydrochloric acid, and 135 mls. of water. The mixture was heated to 100° C. with rapid mixing and held at 100° C. for 1 hr. A fluid dispersion was obtained with a pH of 4.9 and a solids content of 20%. The copolymer was 74.1% neutralized and had a particle size less than 0.05$\mu$.

EXAMPLE 6

The following was charged into a 1-liter resin kettle: 100 gms. of the copolymer of Example 1, 135 mls. of 1 normal phosphoric acid and 270 mls. of water. The mixture was heated to 99° C. with rapid mixing, held for 0.5 hour at temperature, diluted to 10% solids and then discharged. A fluid dispersion was obtained with a pH of 3.78. The copolymer particle size was less than 0.05$\mu$ and the copolymer had a degree of neutralization of 68%.

EXAMPLE 7

The following was charged into a 500 ml. resin kettle: 50 gms. of the copolymer of Example 1, 135 mls. of 2 normal acetic acid, and 65 mls. of water. The mixture was heated to 100° C. with rapid stirring and held until the copolymer dispersed. After diluting to 10% solids, the measured pH was 3.45. The copolymer particle size was less than 0.05$\mu$ and the copolymer had a degree of neutralization of 80.6% when calculated from the theory of weak acids and bases using a Kb of $1 \times 10^{-10}$ for the copolymer of Example 1.

EXAMPLE 8

The following was charged into a 500 ml. resin kettle: 50 gms. of the copolymer of Example 1, 65 mls. of 1 normal oxalic acid, and 135 mls. of water. After heating the mixture at 100° C. with vigorous stirring until the copolymer dispersed, the dispersion was diluted to 10% solids and the pH was determined to be pH 5. The copolymer particle size was less than 0.05$\mu$ and the copolymer had a degree of neutralization of 68%.

EXAMPLE 9

A silica dispersion was prepared by adding 0.9 gm. of 5 micron "Minusil" (Pennsylvania Glass and Sand Co.) to 200 mls. of distilled water in a blender, blending for 10 minutes and then diluting to 1 liter. 20 mls. of this dispersion was added to a glass stoppered 25 ml. graduated cylinder. From 0–5 parts per million of the dispersion of Example 1 was added, and the suspension diluted to 25 mls. and shaken. The silica was then allowed to settle for 1 hour. A 3 ml. sample was then withdrawn from the top of the graduated cylinder and placed in a Bausch & Lomb test tube and the absorbance recorded at 400 m$\mu$ on a Spectronic 20. The results showed that the dispersion is an effective flocculent in the range of 0.25–5.0 p.p.m., having reduced the concentration of silica in the supernatant by a factor of 2 to 5.

EXAMPLE 10

A dispersion of Cabot Carbon Black (0.5 micron particle size) was prepared by adding 0.9 gm. carbon to 200 mls. of water in a blender, blending for 10 minutes and then diluting to 1 liter. 20 mls. of this dispersion was added to a 25 ml. glass stoppered graduate. The cationic copolymer of Example 2 was added at 0, 1, 2, 3, 4 and 5 parts per million. After settling for 1 hr., the following results were obtained:

| Copolymer conc. p.p.m. | Residual carbon gm./liter |
|---|---|
| 0 | 0.55 |
| 1 | 0.27 |
| 2 | 0.087 |
| 3 | 0.065 |
| 4 | 0.090 |
| 5 | 0.075 |

The results show an almost complete removal of the carbon at 2 p.p.m. level. Also, large flocs formed almost immediately.

EXAMPLE 11

A dispersion of clay-containing water was prepared by adding 0.9 gm. of clay to 200 mls. of water in a blender, blending for 10 minutes and then diluting to 1 liter. 20 ml. samples of the dispersion were added to a glass stoppered graduate, either the dispersion of Example 1 or Example 2 added and then diluted to 25 mls. and shaken. The dispersion was then allowed to settle for 1 hr. and the concentration of clay in the supernatant was determined.

| Copolymer conc., p.p.m. | Conc. clay, gm./liter | |
|---|---|---|
| | Example 1 copolymer | Example 2 copolymer |
| 0 | 0.500 | 0.500 |
| 1 | 0.067 | 0.054 |
| 2 | 0.030 | 0.038 |
| 3 | 0.030 | 0.058 |
| 4 | 0.030 | 0.058 |
| 5 | 0.030 | 0.081 |

The results show that these dispersions are an effective flocculent for clay.

EXAMPLE 12

Flocculation of activated sludge-bacteria was accomplished using a system which models the procedures used in conventional sewage treatment plants. The sludge was pumped from a reservoir by a variable speed pump to a mixing tank into which was also pumped either the dispersion of Example 2 or the dispersion of Example 3. From the mixing tank, the treated sludge was discharged into a settling tank. The flow rate of the pump was variable so that various holdup times could be achieved. The concentration of copolymer pumped to the mixing tank was varied so as to give various dose levels. At a dose of 0.66 p.p.m. copolymer for the Example 3 dispersion and 0.73 p.p.m. copolymer for the Example 2 dispersion, and a holdup time of 45 minutes, good clarification of the effluent was observed.

EXAMPLE 13

Using the flow system described in Example 12, the dispersion of Example 2 was evaluated as a flocculent for raw sewage obtained from the Wilmington, Del., sewage treatment plant. At a dosage level of 0.66 p.p.m. copolymer and holdup time of 80 minutes in the settling tank, good clarification was observed, a drop in absorbance from 0.3–0.15 corresponded to a removal of one-half of the turbidity. The solids settled out as a dense stable floc.

EXAMPLE 14

The nitric acid dispersion in Example 3 was diluted to 3% solids, with a 15% solution of acetone and pH taken to 1.3 with nitric acid. This formulation was coated onto surface treated aluminum using a No. 12 Meyer rod, cured 1 minute at 240° C., to give a coating 0.54 micron thick. This coating was tested for pinholes by exposing the surface for 10 minutes to an acid copper sulfate solution containing 10 gms. of ($CuSO_4.5H_2O$) 50 mls. hydrochloric acid conc. and 950 mls. of water. The absence of elemental copper plated on the aluminum indicates a pinhole-free coating.

EXAMPLE 15

Bond paper was coated on one side with the nitric acid dispersion of Example 3 at 2.5% solids using a No. 12 Meyer rod. After drying, the paper was immersed for various lengths of time in a 2% "Merpacyl" Blue dye solution at room temperature. The paper picked up the dye from the dye solution, becoming dyed to a deep blue shade on the coated side after 30 minutes. The color did not bleed off when wet with room temperature water.

EXAMPLE 16

Five grams of filter paper was pulped in a blender, after which 0.001 gm. of Pontamine Fast Turquoise 8GLs was added and the mixture blended. 0.35 gm. of the nitric acid dispersion of Example 3, corresponding to 0.05 gm. of copolymer, was added to the blender and the mixture blended again. When the mixture was filtered, the filtrate was colorless, showing that all the dye remained with the paper. This result showed that colored paper can be prepared by adding the dye and then the acid dispersion at the wet end of a paper machine.

EXAMPLE 17

Two and one-half gms. of an ethylene/t-butylaminoethyl methacrylate copolymer (melt index of 1100) containing 58% t-butylaminoethyl methacrylate was cut into small pieces and placed in a glass bottle containing 10 gms. of water which contains 3.7% of hydrochloric acid. The capped bottle was placed in a mechanical shaker and shaken at room temperature overnight (16 hrs.). The polymer had a degree of neutralization of 129% and dispersed into a very fine particle size dispersion which was stable over a period of several days; i.e., showed no tendency to settle out. Similar results were obtained when 2 ethylene/dimethylaminoethyl methacrylate copolymers of 66% and 78% dimethylaminoethyl methacrylate content respectively were each made into a dispersion in a similar manner. These dispersions had a degree of neutralization of 93.7% and 81.6% respectively.

EXAMPLE 18

A dispersion of ethylene/t-butylaminoethyl methacrylate copolymer of Example 17 made in a fashion similar to Example 17 was diluted with methanol to 1% solids. This dispersion was coated on a 2½" x 5" piece of uncoated, untreated aluminum sheet with a 0.0032 Meyer rod. The coating was air dried at room temperature of 3 hrs. and then cured in a vacuum oven at 240° C. for 10 minutes. The weight of the coating was measured to obtain an average thickness of 0.13 microns based on an assumed specific gravity of 1.0. The coated aluminum sheets were dipped into a solution of copper sulfate and hydrochloric acid for 15 seconds. The back (uncoated) side of the aluminum reacted very rapidly whereas the coated side showed no reaction, not even to the extent of spots which would have indicated pinholes in the coating.

EXAMPLE 19

A piece of aluminum coated to a thickness of about 0.56 micron in a fashion similar to Example 18 was cold formed into a small cup about ½" high and about ¾" in diameter by the rapid blow of a piston into a socket. The coating showed a remarkable ability to deform under these conditions and showed no evidence of cracking or delamination.

EXAMPLE 20

A dispersion based on an ethylene/dimethylaminoethyl methacrylate copolymer containing 30% dimethylaminoethyl methacrylate and having a solids content of about 1.5% was coated on aluminum and cured for 5 minutes at 250° C. in an air oven. A coating of only 0.034 micron was obtained. The coating was tested for adhesion by cross-hatching it with a razor blade and then attempting to pull it off using a high tack (No. 610) Scotch tape. No delamination of the coating was observed. Similar results were obtained when a similar dispersion was used to make a thin coating on Mylar ® polyester film. This coating was cured for 10 minutes in an air oven at 175° C.

What is claimed is:

1. A process for preparing a stable, aqueous colloidal dispersion comprising: mixing (1) a copolymer of about 20 to 80 percent by weight ethylene and about 80 to 20 percent by weight of an aminoalkyl acrylate of the formula:

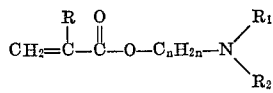

wherein

R is hydrogen or methyl, $R_1$ and $R_2$ are each a member selected from the group consisting of hydrogen and alkyl of 1 to 4 carbon atoms, and $n$ is a positive integer of 1 to 4 inclusive, (2) an acid having a dissociation constant greater than $10^{-5}$, and (3) water in ratios sufficient to provide a solids content within the range of about 5 to 30 percent by weight and a degree of neutralization of the amine groups of the polymer of at least about 40 percent, at a temperature such that the copolymer will be dispersed into a particle size less than 0.1 micron.

2. The process of claim 1 wherein the aminoalkyl acrylate is selected from the group consisting of N,N-dimethylaminoethyl acrylate, N,N - dimethylaminoethyl methacrylate, N-methylaminoethyl acrylate, N - methylaminoethyl methacrylate, N-t-butylaminoethyl acrylate, N-t-butylaminoethyl methacrylate, N,N-dimethylaminopropyl acrylate and N,N-dimethylaminopropyl methacrylate, and the copolymer has a melt index within the range of about 0.1 to 5000 and the degree of neutralization is within the range of 40 to 95 percent.

3. The process of claim 2 wherein the copolymer is about 50 to 80 percent by weight ethylene and about 50 to 20 percent by weight aminoalkyl acrylate, and the copolymer is dispersed by heating the mixture to a temperature above the melting point of the copolymer.

4. The process of claim 3 wherein the degree of neutralization is within the range of about 60 to 70 percent and the acid is a mineral acid.

5. The process of claim 4 wherein the solids content is within the range of about 10 to 20 percent by weight.

6. The process of claim 5 wherein the copolymer is about 50 to 80 percent by weight ethylene and about 50 to 20 percent by weight N,N-dimethylaminoethyl methacrylate.

7. The process of claim 6 wherein the copolymer has a melt index of about 1 to 500.

8. A stable, aqueous, cationic polyelectrolyte dispersion comprising: a copolymer of about 20 to 80 percent by weight ethylene and about 80 to 20 percent by weight of an aminoalkyl acrylate of the formula:

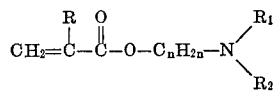

wherein

R is hydrogen or methyl, $R_1$ and $R_2$ are each a member selected from the group consisting of hydrogen and alkyl of 1 to 4 carbon atoms, and $n$ is a positive integer of 1 to 4 inclusive, self-dispersed in water with an acid having a dissociation constant greater than $10^{-5}$, said copolymer having a degree of neutralization of the amine groups of at least 40 percent and a particle size less than 0.1 micron and said dispersion having a solids content within the range of about 5 to 30 percent by weight.

9. The dispersion of claim 8 wherein the aminoalkyl acrylate is selected from the group consisting of N,N-dimethylaminoethyl acrylate, N,N - dimethylaminoethyl methacrylate, N-methylaminoethyl acrylate, N-methylaminoethyl methacrylate, N-t-butylaminoethyl acrylate, N-t-butylaminoethyl methacrylate, N-N - dimethylaminopropyl acrylate and N,N-dimethylaminopropyl methacrylate, and the copolymer has a melt index within the range of about 0.1 to 5000 and the degree of neutralization is within the range of 40 to 95 percent.

10. The dispersion of claim 9 wherein the copolymer is about 50 to 80 percent by weight ethylene and about 50 to 20 percent by weight aminoalkyl acrylate.

11. The dispersion of claim 10 wherein the acid is a mineral acid.

12. The dispersion of claim 11 wherein the degree of neutralization is within the range of about 60 to 70 percent.

13. The dispersion of claim 12 wherein the solids content is within the range of about 10 to 20 percent by weight.

14. The dispersion of claim 13 wherein the copolymer is about 50 to 80 percent by weight ethylene and about 50 to 20 percent by weight N,N-dimethylaminoethyl methacrylate.

References Cited

UNITED STATES PATENTS 3,395,198  7/1968  Taniguchi et al.
3,480,463  11/1969  Rankin.

MELVIN GOLDSTEIN, Primary Examiner

U.S. Cl. X.R.

260—29.6 PM